United States Patent
Bellabal et al.

(10) Patent No.: US 8,919,723 B2
(45) Date of Patent: Dec. 30, 2014

(54) TURBOJET ENGINE FAN DUCT SUSPENSION USING CONNECTING RODS WITH ELASTOMER BUSHING

(75) Inventors: Francois Robert Bellabal, Fontainebleau (FR); Thomas Gerard Daniel Riviere, Noisy le Grand (FR)

(73) Assignee: SNECMA, Paris (FR)

( * ) Notice: Subject to any disclaimer, the term of this patent is extended or adjusted under 35 U.S.C. 154(b) by 152 days.

(21) Appl. No.: 13/561,667

(22) Filed: Jul. 30, 2012

(65) Prior Publication Data

US 2013/0037688 A1 Feb. 14, 2013

(30) Foreign Application Priority Data

Aug. 10, 2011 (FR) ...................................... 11 57285

(51) Int. Cl.
*F16M 13/00* (2006.01)
(52) U.S. Cl.
USPC .......................................... 248/560; 248/634
(58) Field of Classification Search
USPC ........ 267/140.12, 219, 152, 140.11; 248/560, 248/634
See application file for complete search history.

(56) References Cited

U.S. PATENT DOCUMENTS

| | | | |
|---|---|---|---|
| 2,365,421 A | 12/1944 | Hugh | |
| 2,430,613 A * | 11/1947 | Hodge | 269/138 |
| 3,008,368 A * | 11/1961 | Hammitt et al. | 411/368 |
| 5,209,620 A * | 5/1993 | Zare-Ardestani | 411/104 |
| 5,397,112 A * | 3/1995 | Roth et al. | 267/140.12 |
| 6,106,030 A * | 8/2000 | Nader et al. | 285/368 |
| 6,202,994 B1 * | 3/2001 | Spurlin | 267/136 |
| 6,328,293 B1 | 12/2001 | Olsen | |
| 8,496,381 B2 * | 7/2013 | Hunter et al. | 384/286 |
| 2005/0194493 A1 | 9/2005 | Marche | |
| 2008/0315064 A1 | 12/2008 | Dron et al. | |

FOREIGN PATENT DOCUMENTS

| | | |
|---|---|---|
| EP | 1 571 081 A1 | 9/2005 |
| EP | 2 008 933 A1 | 12/2008 |
| WO | WO 00/17049 A1 | 3/2000 |

OTHER PUBLICATIONS

French Preliminary Search Report issued Apr. 25, 2012 in corresponding French Application No. 11 57285 filed on Aug. 10, 2011 (with an English Translation of Categories).
U.S. Appl. No. 13/821,465, filed Mar. 7, 2013, Bellabal, et al.

* cited by examiner

*Primary Examiner* — Amy J. Sterling
(74) *Attorney, Agent, or Firm* — Oblon, Spivak, McClelland, Maier & Neustadt, L.L.P.

(57) ABSTRACT

Device for adjusting the length of a connecting rod and consisting of a bushing positioned inside an eye of the said connecting rod, the said bushing comprising at least one element in which there is made a bore to act as a support for a pivot pin intended to pass through the eye, characterized in that the said element is a cylinder made of a metallic material covered by a cylinder made of an elastomeric material so as to form with the metallic cylinder a cylinder homothetic with the previous one, the generatrices of the said cylinders being oriented in a direction that is inclined with respect to the longest length of the said connecting rod.

8 Claims, 4 Drawing Sheets

TURBOJET ENGINE FAN DUCT SUSPENSION USING CONNECTING RODS WITH ELASTOMER BUSHING

BACKGROUND OF THE INVENTION

1. Field of the Invention

The field of the present invention is that of turbojet engines and of the components that join their various parts together. It relates more particularly to the components that ensure the mechanical integrity of the fan duct of bypass turbojet engines.

2. Description of the Related Art

A propulsion engine, such as a turbojet engine, may be mounted at various locations on the aeroplane, by attaching it to a strut or pylon belonging to the structure thereof. It may thus be suspended under the wing, fixed to the fuselage, generally at the rear, or mounted in the tail using appropriate means of attachment. These means of attachment have the function of transmitting mechanical load between the engine and the structure of the aeroplane. The loads that have to be taken into consideration are notably the weight of the engine along the vertical axis Z, its thrust along the axis X of the engine, and lateral aerodynamic loading along the transverse axis Y. The loads that have to be transmitted thus include reacting the rotational torque about the axis of the engine. These means have also to absorb, without transmitting it to the strut, deformation experienced by the engine during the various phases of flight as a result for example of dimensional variations caused by thermal expansion or contraction.

One method of suspension, for example, in the case of a turbofan engine, is to attach the engine to a strut belonging to the structure of the aeroplane using a front suspension or fastener and a rear suspension or fastener. The front suspension is fixed in particular to the intermediate case downstream of the fan case and the rear suspension is fixed to the exhaust case for the primary flow. These two parts constitute the structural elements of a turbomachine on which all load is reacted.

Modern turbojet engines are bypass turbomachines with high bypass ratios, the bypass air being compressed by a single compressor stage known as the fan stage. On leaving this stage it is guided along a duct directly into a nozzle to contribute to the thrust produced by the engine. It thus flows between the main spool of the engine, delimited by cases, and a cold flow duct (more usually known as the outer fan duct, or OFD). For weight saving reasons, this duct is commonly made of composite. This duct is attached to the engine via connections at its two longitudinal ends, a first fixing being at the upstream end to the case surrounding the fan and a second at the rear end to a mounting ring borne by the exhaust case.

The connection between the mounting ring and this exhaust case is generally achieved by means of arms that pass across the fan flow. In more recent embodiments, it may also be afforded by profiled connecting rods attached firstly to the fan duct and secondly to the exhaust case, and this allows a significant reduction in the mass devoted to this connection. In this scenario of connecting rod attachment, the connection is performed by a latticework of connecting rods, generally six or eight of these, which are attached at six or eight points to the mounting ring as shown in FIG. 2 or 3. An example of how a fan duct is attached using six connecting rods is, moreover, described in the applicant company's patent application FR 1153947 filed on 9 May 2011.

Such an assembly is deliberately statically indeterminate, notably to ensure that the turbomachine is held optimally in position by imposing a limit on the degree to which it can become distorted. The downside of such a choice is that the system is difficult to fit and that devices for adjusting the length of the connecting rods need to be provided, otherwise mounting becomes impossible. Thus it is necessary to provide a system for adjusting the position of the ball ends of the connecting rods as a function of the length of these rods, or alternatively for adjusting the position of the pins mounted on the ring, in order to take account of the manufacturing tolerances on each of the connecting rods and on the yokes of the exhaust case and of the ring.

In the prior art, the connecting rods are generally adjusted using an eccentric bushing incorporated into an eye of the connecting rod, and the turning of which makes it possible to adjust the length of the connecting rod to suit the desired distance. In these embodiments, the axis of the hole in the connecting rod is not necessarily aligned with the axis of the connecting rod, because of the eccentric. Under load, this generates an undesirable moment at the attachment of the connecting rod and the bushing therefore has a tendency to turn. Further, instances of seizure associated with the use of these eccentric bushings have been observed in service. Finally, the possibilities of adjustment offered by this device are still limited.

One solution envisaged has been to use an eccentric at the ring end and to add a system for preventing the bushing from turning. However, such a system is difficult to employ and represents a not inconsiderable additional weight.

BRIEF SUMMARY OF THE INVENTION

It is an object of the present invention to overcome these disadvantages by proposing a device for adjusting the length of the connecting rods that hold a fan duct in position which does not have the disadvantages encountered with the devices of the prior art and which allows this length to be adjusted easily without offsetting the connecting rods and which allows a preload to be introduced into the connecting rods.

To this end the subject of the invention is a device for adjusting the length of a connecting rod and consisting of a bushing positioned inside an eye of the said connecting rod, the said bushing comprising at least one element in which there is made a bore to act as a support for a pivot pin intended to pass through the eye, characterized in that the said element is a cylinder made of a metallic material covered by a cylinder made of an elastomeric material so as to form with the metallic cylinder a cylinder homothetic with the previous one, the generatrices of the said cylinders being oriented in a direction that is inclined with respect to the longest length of the said connecting rod.

An adjusting bushing is thus obtained which is easy to produce, by producing a right cylinder which is then cut at an angle. The inclined direction of the surface of the element creates a ramp effect and ensures that any lateral movement, which means movement perpendicular to the direction of greatest length of the connecting rod, will be combined with a longitudinal movement and therefore with a variation in the length of the connecting rod. The elastomer layer, because of its inclined orientation, deforms in shear, which requires only relatively limited force.

Advantageously, the bushing comprises two metallic cylinders covered by two cylinders made of elastomeric material, the said cylinders being symmetric with one another about a plane and being intended to be positioned in the eye on each side of a plane passing through the axis of the said connecting rod. These cylinders can then be incorporated in a permanent position in the eye of a connecting rod.

In one particular embodiment, the cylinders further have symmetry about a second plane, orthogonal to the first, so that the two cylinders are geometrically identical. This configuration makes the bushings easier to produce as only one pattern of cylinder is needed rather than two.

The invention also relates to a connecting rod comprising, at least at one of its ends, an eye fitted with a bushing equipped with a device as described hereinabove.

In one particular embodiment, the connecting rod comprises, at least at one of its ends, an eye having, in cross section on the plane that passes through the axis of the connecting rod and the direction of the pivot pin, a herringbone shape and in which there is inserted a bushing equipped with two cylinders which are symmetric with one another about a plane and positioned in the eye on each side of a plane passing through the axis of the said connecting rod.

Advantageously, the eye has, in cross section on a plane orthogonal to the direction of the generatrices of the said cylinders, the shape of a circle. This shape makes it possible to increase, on the one hand, the rotational flexibility of the bushing with respect to the eye and, on the other hand, the maximum angular excursion of the connecting rod. In an alternative form of embodiment, the connecting rod is equipped with a pivot pin passing through its eye and the pivot pin comprises at least one end stop limiting the movement of the said element in the direction transverse to the direction of the said greatest length.

In a second alternative form of embodiment, the pivot pin further comprises a clamping ring able to push the said element towards the said end stop.

For preference, in this second alternative form, the eye has, in cross section on the plane passing through the axis of the connecting rod and through the pivot pin, a herringbone shape with the vertex oriented in the direction of the shank of the said connecting rod. This configuration allows the connecting rod to be prestressed, simply by tightening the ring.

BRIEF DESCRIPTION OF THE SEVERAL VIEWS OF THE DRAWINGS

The invention will be better understood, and further objects, details, features and advantages thereof will become more clearly apparent during the course of the detailed explanatory description which follows of a number of embodiments of the invention which are given purely by way of illustrative and nonlimiting examples, with reference to the attached schematic drawings.

In these drawings.

DETAILED DESCRIPTION OF THE INVENTION

Figure 1:
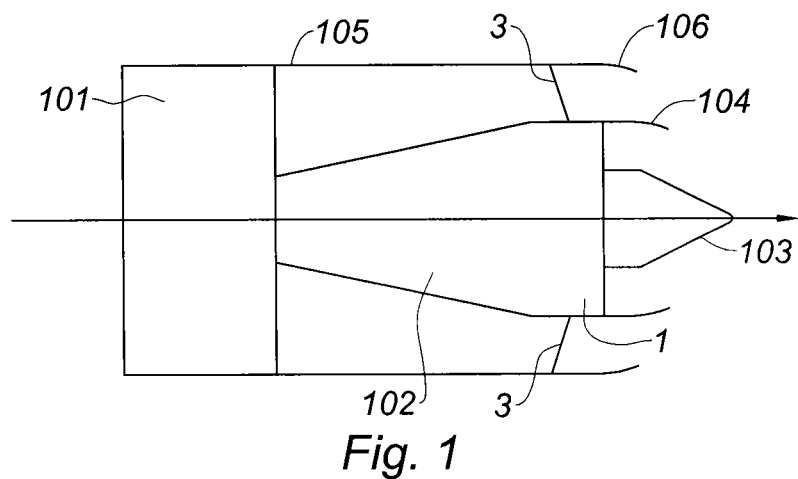
FIG. 1 is a schematic view of a bypass turbojet engine, with a connecting rod link between the exhaust case and the fan duct support ring.

Reference is made to FIG. 1 which shows a stylized depiction of a bypass turbojet engine comprising a fan 101, a primary spool 102 which at its downstream end has an exhaust case 1 contributing to the structure of the engine, and a tail cone 103. The primary flow, which passes through the primary spool, is ejected in a primary nozzle 104 surrounding the tail cone, while the bypass flow, which comes from the fan, is guided downstream thereof by a fan duct 105 ending in a secondary nozzle 106. The fan duct 105 is attached to the exhaust case 1 by a latticework of connecting rods 3 which are inclined with respect to a radial plane of the engine, the attachment to the fan duct being positioned upstream of the attachment to the exhaust case.

Figure 2:
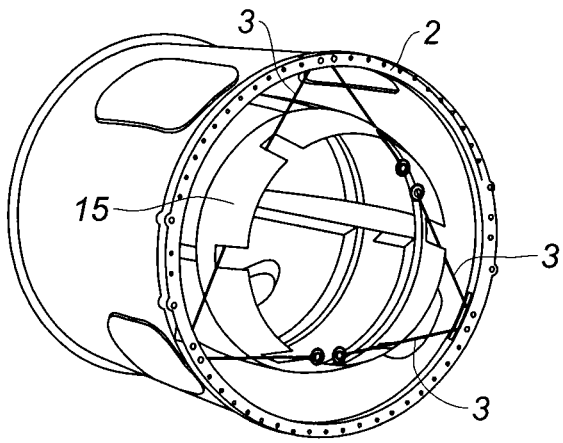
FIG. 2 is a perspective view of a fan duct and of the method whereby it is attached to the exhaust case of a bypass turbojet engine.

FIG. 2 shows an inner fan duct 15 which envelops the intermediate case (not visible in the figure) of a bypass turbojet engine. It is cylindrical and itself placed coaxially inside a fan duct 2. The fan duct is supported in the region of the exhaust case by a latticework of six connecting rods 3 which are mounted on a conventional ball joint at the exhaust case 1 end and on a device according to the invention, which will be described in detail later on, at the fan duct 2 end.

Figure 3:
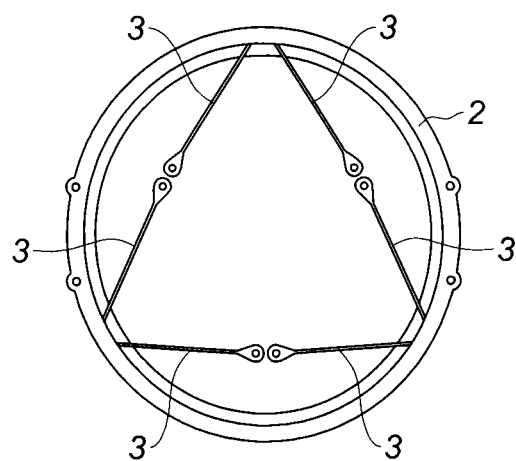
FIG. 3 is a side view of the fan duct of FIG. 2 and of its connecting rods that hold it in position.

FIG. 3 shows the same fan duct in side view, with its six connecting rods 3 arranged in such a way as more or less to form a triangular latticework. The connecting rods in the conventional way comprise an eye at the exhaust case 1 end (not depicted) intended to collaborate, via a pivot pin, with a yoke fixed to said case.

Figure 4:
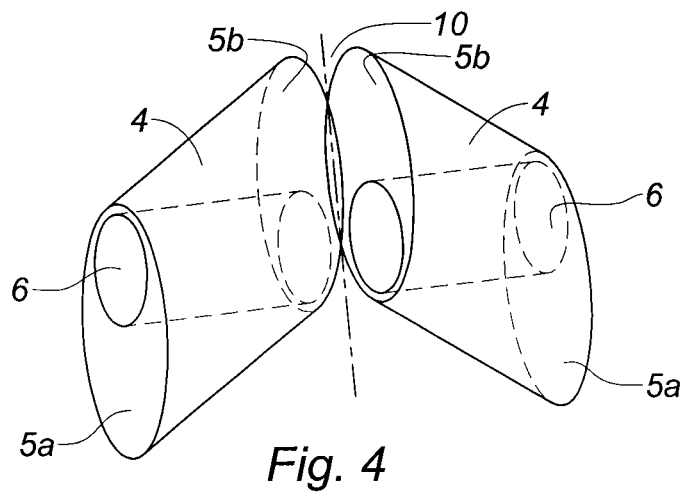
FIG. 4 is a perspective view of an element of the device for adjusting the length of the connecting rods that hold a fan duct in position according to one embodiment of the invention.

Reference is now made to FIG. 4 which shows an element that forms part of the device for attaching a connecting rod 3 to the fan duct 2. This element consists of two metallic cylinders 4 which face one another, being symmetric with respect to one another about a plane passing through the axis of the connecting rod on which they are intended to be fixed and which are distant from one another by a separation space. They are also symmetric about a plane perpendicular to the previous one, which means that they are both geometrically identical. As their directrix, these two cylinders have a closed curve and as their generatrices they have straight lines the direction of which is inclined with respect to the axis of the connecting rod 3, which connects its two eyes and which is indicated by a dashed line in the figure. As depicted, and without this shape being an imperative requirement, the directrix has the shape of an ellipse the major axis of which is oriented parallel to the axis of the connecting rod 3. The metallic cylinders 4 are closed at their two ends by planar faces 5a and 5b both of which are parallel to the plane of symmetry placed between these two cylinders 4. The external faces 5a are those which are furthest from one another while the internal faces 5b immediately face one another across the separating face.

These two cylinders have, passing through them, at right angles to their terminal faces 5a and 5b, a bore 6 that is a cylinder of revolution the diameter of which more or less corresponds to that of the pivot pin that secures the connecting rod 3 to the corresponding yoke carried by the mounting ring of the fan duct 2. The bores 6 of the two metallic cylinders 4 are aligned with one another and oriented perpendicular to the terminal faces 5a and 5b, so that when mounted, the connecting rod 3 can turn about this bore and about the pivot pin 7 that will pass through it.

FIGS. 5 to 9 show the two metallic cylinders 4 in place in the eye 9 of the connecting rod 3, to allow the latter to rotate about the pin 7. This pivot pin is held in place by a collaboration (not depicted) with the corresponding yoke 11 which extends from the fan duct 2. The eye 9 consists of two hollowed-out cylinders facing one another and meeting at their middle; the generatrices of these cylinders are inclined with respect to the axis of the connecting rod, which in cross section results in lines in the shape of an inverted V, with the appearance of two herringbones. As for its shape in cross section, this is dictated by the shape given to the directrix of these cylinders which is designed so that the bushing surrounded by a stack of elastomer layers according to the invention can fit into this eye and remain fixed therein.

These figures show that each of the metallic cylinders 4 is extended on either side of its respective bore 6 by a second cylinder 8 made of a stack of layers of elastomer and of layers of metal intercalated in one another so as to offer superior compressive strength, the second cylinder 8 enveloping the metallic cylinder 4 in the fashion of a ring. The layers of elastomer are preferably cylindrical, the shape of the cylinder being circular in cross section normal to the direction of inclination. That makes it possible to increase the rotational flexibility of the connecting rod and the maximum angular excursion. Indeed, the radial stack made up of layers of elastomer and of metal intercalated between one another allows the layers to slip nicely on one another.

The elastomer cylinder 8 has as its directrix a line homothetical with that of the metallic cylinder and as its generatrices lines which are parallel to those of the metallic cylinder 4. This homothetic cylinder is hollowed in such a way as to house therein the metallic cylinder 4 to which it is connected by bonding or by any other means of connection. Finally, its terminal faces are preferably aligned with those 5a and 5b of the metallic cylinder 4, without this configuration being essential to embodying the invention. This then yields two overall cylinders (metallic cylinder 4 surrounded by an elastomer cylinder 8) which are positioned symmetrically with respect to one another about the plane in which the connecting rod 3 turns. Together they form a bushing which is positioned in the eye 9 of the connecting rod 3 and which has the function of providing an interface between this eye and the pivot pin 7 of the corresponding yoke. It also has a further function of adjusting the length of the connecting rod 3, a function which, in the prior art, was performed by an eccentric bushing.

Figure 5:
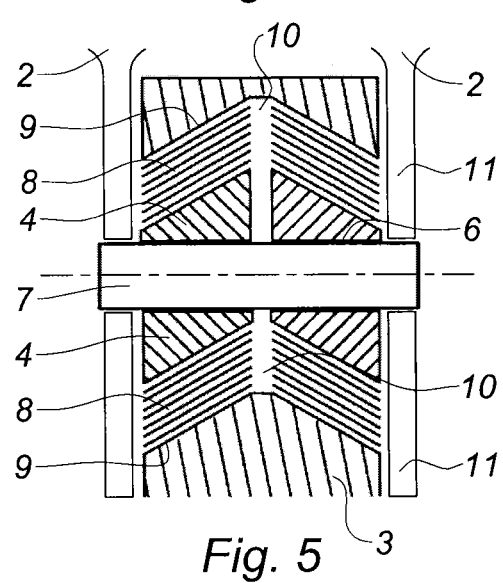
FIG. 5 is a view in cross section of a device for adjusting the length of the connecting rods that hold a fan duct in position, in the nominal position, without tensioning.

In FIG. 5, the bushing is at rest, which means to say that no force, either tensile or compressive, is applied to it by the connecting rod. It is, by way of example, in the position it has upon the fitting of the connecting rod 3 on the yoke 11 of the fan duct, the other end of the connecting rod having not yet been fitted into its yoke on the exhaust case 1. A space 10, in the form of a disc, pierced at its centre and with parallel faces, is left between the internal faces 5b of the two metallic cylinders 4 and between the continuation thereof onto the two elastomer cylinders 8.

Figure 6:
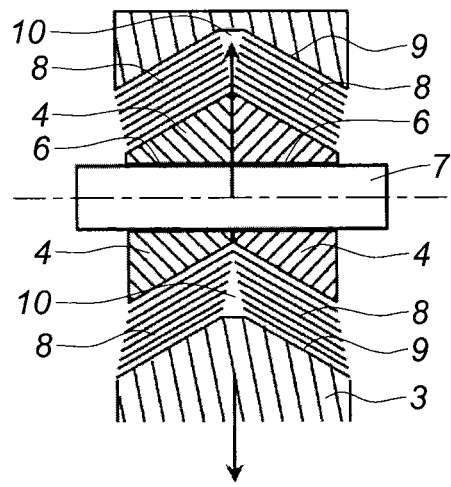
FIG. 6 is a view in cross section of the adjusting device of FIG. 5, subjected to a force that tends to lengthen the connecting rod.

In FIG. 6, tension is applied to the connecting rod 3 in the direction of the bottom of the figure, and this causes a reaction force on the pivot pin 7, thus compressing the top part of the bushing. Because the generatrices of the metallic cylinders 4 and those of the elastomer cylinders 8 are inclined, this compression causes the metallic cylinders 4 to move towards one another until they come into contact with one another. The space 10 deforms at the same time until, in cross section, it has adopted the shape of two cones the vertices of which are in contact with the ends of the internal faces 5b of these metallic cylinders. As depicted in the figure, the external faces of the elastomer cylinders 8 are fixed to the internal wall of the eye 9 to prevent them from moving laterally whereas their internal faces follow the external faces of the metallic cylinders 4 to which they too are fixed.

Figure 7:
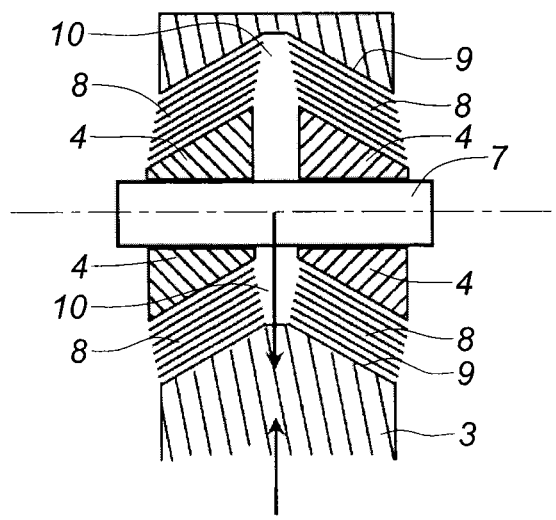
FIG. 7 is a view in cross section of the adjusting device of FIG. 5, subjected to a force that tends to shorten the connecting rod.

Conversely, FIG. 7 shows the deformation of the bushing in the event of the connecting rod experiencing a compressive force in the direction of the yoke 11. Again because of the inclination of the generatrices of the cylinders 4 and 8, the metallic cylinders 4 move towards the outside of the bushing and the space 10 becomes enlarged until in cross section it forms two triangles oriented in the opposite direction to the previous one.

Figure 8:
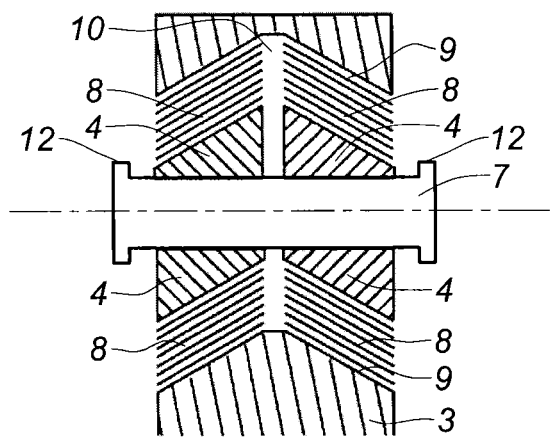
FIG. 8 is a view in cross section of a first alternative form of the device of FIG. 5.

FIG. 8 shows a bushing identical to that of FIG. 7 in which the pivot pin 7 comprises end stops 12 extending radially so as to limit the lateral movement of the metallic cylinders 4 and prevent the bushing from coming apart under the action of excessive compression by the connecting rod 3.

Figure 9:
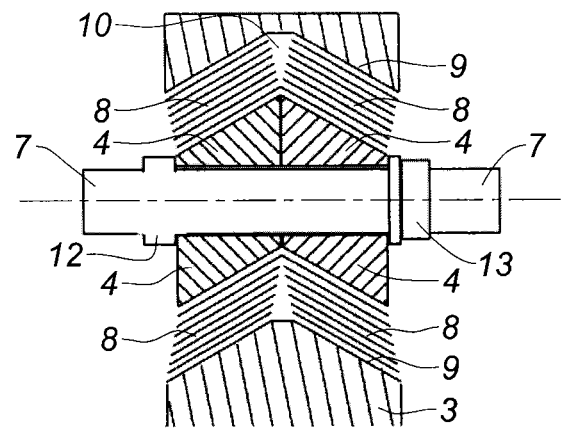
FIG. 9 is a view in cross section of a second alternative form of the device of FIG. 5.

Finally, FIG. 9 shows a second alternative form of the bushing of the previous figures, in as much as the pivot pin 7 comprises, on one side of the bushing, a shoulder 12 that acts as an end stop and, on the other side, a clamping ring 13 which, by being screwed onto a thread provided on the pin 7, allows the two metallic cylinders 4 to be moved closer together, independently of the load applied by the connecting rod. These two elements, which act chiefly to move the metallic cylinders 4 closer together, also act as end stops for the separation of these cylinders, as in the case of the first alternative form illustrated in FIG. 8. The shoulder 12 could, in an alternative version, be a second ring or a bushing, to make it easier to insert the pin into the yoke 11.

Figure 10:
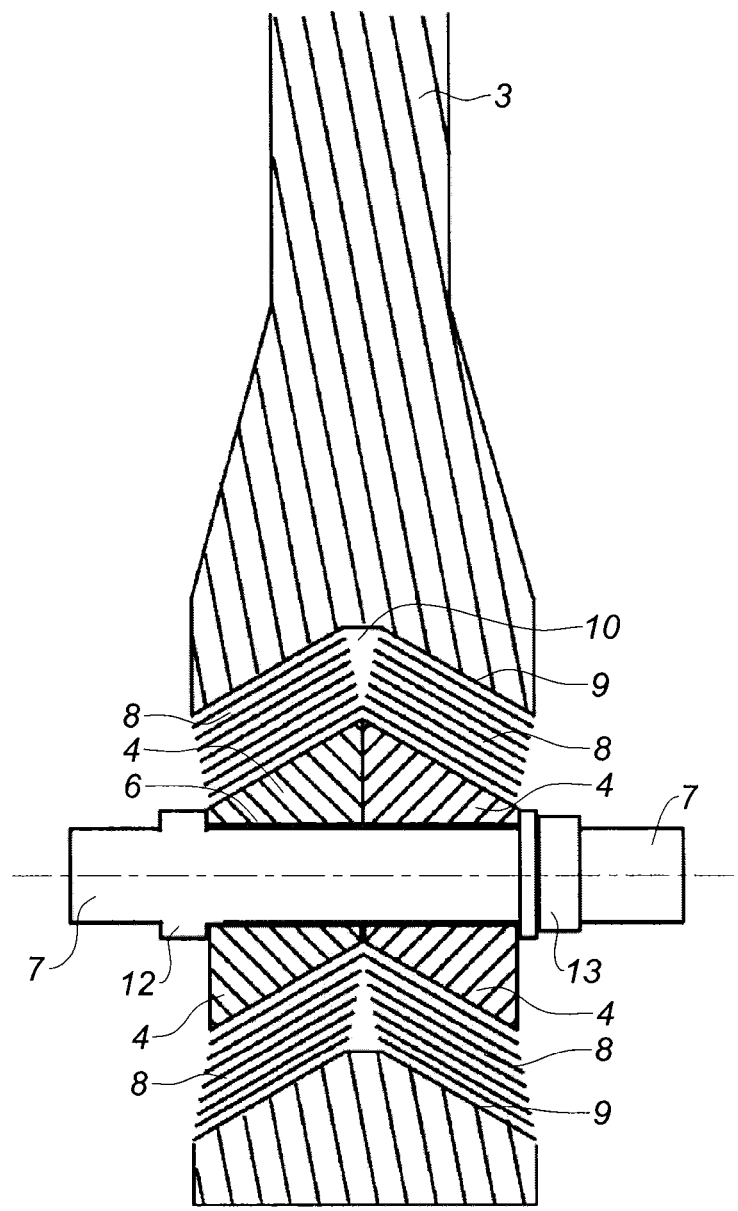
FIG. 10 is a view in cross section of the device of FIG. 9, in position on a connecting rod that holds a fan duct in position.

Finally, FIG. 10 shows the bushing according to the second alternative form of the invention, in position on a connecting rod 3. Unlike in the previous figures, the V-shaped vertex of the bushing is here oriented towards the shank of the connecting rod 3, i.e. towards that part of the connecting rod situated between its two eyes. The clamping ring 13 here is in a tightened position, and this presses the two metallic cylinders 4 against one another and tends to shorten the length of the connecting rod. Because the bushings of the connecting rod have already been mounted on the yokes of the exhaust case 1 and of the fan duct 2, tightening the ring 13 does not produce any variation in its length but does create a preload, something which is commonly sought after in order to ensure the stability of the latticework of connecting rods that hold the fan duct in position.

The benefit provided by the invention will now be described on the basis of the main embodiment. The way in which the invention works is the same in both variations described.

The invention makes it possible to use a structure of elastomeric type for the connection between connecting rod and mounting ring. This type of elastomeric connection between the mounting ring and the connecting rods is used for all the connecting rods of the latticework, in order to allow ease of mounting under statically indeterminate conditions; it also has the advantage of damping vibration. Only the ends of the connecting rods at the fan duct mounting ring end are able to accept this type of elastomeric connection because the temperature in their immediate surroundings remains relatively modest. It cannot in theory be applied to the exhaust case end because the temperature there is too high and incompatible with a sufficient durability of the elastomeric material.

In order to address the problem of adjusting the length of the connecting rod 3 and allowing the pivot pin 7 of the yoke 11 to move during mounting, the idea supplied by the invention is to have the layers of elastomer work in shear because of the bevelled arrangement of the various elements. Thanks to this arrangement of the elastomer, the invention makes it possible to achieve low stiffness, because the shear modulus of this material is very low. It therefore allows the pin sufficient radial movements (of the order of one millimeter) to allow mounting and, once the connecting rods have been mounted, the stiffness of the latticework remains sufficiently great.

By pulling on the connecting rod, the metallic cylinders 4 are made to move at an angle, therefore both radially and translationally along the axis. The force required to obtain the desired radial movement is chosen to be equal to the handling force that the operator is able to apply. Because the stack works in shear, the movement obtained is relatively great for a force that remains modest and therefore at a level that an operator can apply by hand.

The result is that it is found that the connection rigidities during mounting and in operation are very different: in particular, they are low for mounting but great for operation on an engine. The movement of the metallic cylinders 4, under an action of pulling on the connecting rod, i.e. normal operation, is limited by these two metallic cylinders coming into contact with one another. Once the parts are in abutment, most of the load passes by compression between the various layers of elastomer, giving the connecting rod latticework connection the sufficiently high rigidity required. Thus, the statically indeterminate nature of the assembly, which is beneficial to engine performance, is maintained during operation.

It is also found that the system is able to damp vibrations originating from the internal part of the engine, and not only the vibration originating from the connection between the pylon and the engine. Finally, the bushing is relatively easy to manufacture, it being possible for the result to be obtained by cutting at a bevel angle an assembly which is initially produced in the form of a right cylinder.

In the case of the first and second alternative forms, there is a direction of stress under load which implies that the two metallic parts diverge, as shown in FIG. 7. The alternative forms provide an end stop device or shoulder 12 on the pivot pin 7, which prevents the bushing from coming apart if the force applied were to become particularly high.

The second alternative form also has a further advantage which stems from the fact that there is no need to apply force to the connecting rod in order to adjust the position of the centre of the pivot pin 7 and the length of the connecting rod. All that is required is for the two metallic cylinders 4 to be clamped together by using the shoulder 12 of the pin 7 and by tightening the clamping ring 13 on the other side. This also avoids movement once the connecting rods have been fitted.

When fitting the second alternative form, while the clamping ring 13 has not been tightened, the two metallic cylinders are free to move and the shoulder 12, just like the clamping ring 13, act as end stops to limit the outwards radial movement of the cylinders and prevent the bushing from coming apart.

Furthermore, the choice made in this second alternative form to position the point of the V of the bushing towards the shank of the connecting rod 3 allows pretension to be applied to the connecting rod, and this is beneficial given that these connecting rods are generally rated for buckling. This preload can thus be applied relatively easily by an operator, without the need to resort to mounting them hot.

It should finally be noted that in this second alternative form, the system of adjusting the distance between axes is fully incorporated into the connecting rod and located, as in the prior art, at the connection between the connecting rod 3 and the fan duct mounting ring 2; in addition, the end stop system using the shoulder 12 and the simple immobilizing using the clamping ring 13 allows the post-fitting behaviour of the connecting rod to be locked in.

The invention claimed is:

1. A device for adjusting the length of a connecting rod comprising:
    a bushing positioned inside an eye of the connecting rod, the bushing comprising
        first and second metallic cylinders facing each other and being symmetric to each other with respect to a first plane passing through an axis of the connecting rod, the first and second metallic cylinders each including a bore, each bore having an axis oriented perpendicular to the axis of the connecting rod, the axes of the bores being aligned with each other; and
        first and second elastomeric cylinders homothetic with and surrounding the first and second metallic cylinders, respectively,
    wherein generatrices of the metallic and elastomeric cylinders are oriented in a direction that is inclined with respect to the axis of the connecting rod, and
    wherein a space is provided between internal faces of the first and second metallic cylinders facing each other, the space presenting a disc shape with parallel faces.

2. The device according to claim 1, wherein the first and second metallic cylinders are symmetric to each other about a second plane, orthogonal to the first plane, so that the first and second metallic cylinders are geometrically identical.

3. A connecting rod comprising:
an eye at an end thereof; and
a bushing positioned inside the eye, the bushing comprising:
    first and second metallic cylinders facing each other and being symmetric to each other with respect to a first plane passing through an axis of the connecting rod, the first and second metallic cylinders each including a bore, each bore having an axis oriented perpendicular to the axis of the connecting rod, the axes of the bores being aligned with each other; and
    first and second elastomeric cylinders homothetic with and surrounding the first and second metallic cylinders, respectively,
wherein generatrices of the metallic and elastomeric cylinders are oriented in a direction that is inclined with respect to the axis of the connecting rod, and
wherein a space is provided between internal faces of the first and second metallic cylinders facing each other, the space presenting a disc shape with parallel faces.

4. The connecting rod according to claim 1, wherein the eye presents, in cross section on the first plane that passes through the axis of the connecting rod and a direction of the pivot pin, a herringbone shape.

5. The connecting rod according to claim 3, wherein the eye presents, in cross section on a plane orthogonal to the direction of the generatrices of the cylinders, a shape of a circle.

6. The connecting rod according to claim 3 further comprising a pivot pin passing through the eye,
    wherein the pivot pin comprises at least one end stop which limits movement of the bushing in a direction transverse to a direction parallel to the axis of the connecting rod.

7. The connecting rod according to claim 6, wherein the pivot pin further comprises a clamping ring able to push the bushing towards the end stop.

8. The connecting rod according to claim 7, wherein the eye presents, in cross section on the plane passing through the axis of the connecting rod and through the pivot pin, a herringbone shape with a vertex oriented in a direction of a shank of the connecting rod.

* * * * *